(12) United States Patent
Cooper et al.

(10) Patent No.: US 6,240,964 B1
(45) Date of Patent: Jun. 5, 2001

(54) ENERGY ATTENUATION DEVICE FOR A FLUID CONVEYING LINE AND METHOD OF ATTENUATING ENERGY IN SUCH A LINE

(75) Inventors: Jack R. Cooper, Dearborn; Yungrwei Chen, West Bloomfield, both of MI (US)

(73) Assignee: Dayco Products, Inc., Dayton, OH (US)

(*) Notice: Subject to any disclaimer, the term of this patent is extended or adjusted under 35 U.S.C. 154(b) by 0 days.

(21) Appl. No.: 09/471,048

(22) Filed: Dec. 22, 1999

Related U.S. Application Data

(62) Division of application No. 08/853,770, filed on May 9, 1997, now Pat. No. 6,125,890.
(60) Provisional application No. 60/020,946, filed on Jul. 1, 1996.

(51) Int. Cl.[7] ................................................ F16L 55/04
(52) U.S. Cl. .............................. 138/30; 138/131; 181/208
(58) Field of Search ............................... 138/131, 26, 30, 138/134; 181/208; 60/469

(56) References Cited

U.S. PATENT DOCUMENTS

| | | | | |
|---|---|---|---|---|
| 593,726 | * | 11/1897 | Nicholls | 138/131 |
| 790,971 | * | 5/1905 | Nicholls | 138/131 X |
| 889,423 | * | 6/1908 | Wood | 138/30 X |
| 2,467,559 | * | 4/1949 | Mahlberg | 138/131 |
| 2,858,854 | * | 11/1958 | Daggett | 138/131 X |
| 2,875,789 | * | 3/1959 | Wright | 138/31 |
| 2,986,169 | * | 5/1961 | McCormick | 138/131 X |
| 3,016,503 | * | 1/1962 | Pierce | 138/131 X |
| 3,273,596 | * | 9/1966 | Beckett | 138/110 X |
| 3,323,305 | * | 6/1967 | Klees | 60/52 |
| 3,527,258 | * | 9/1970 | Farr | 138/131 |
| 3,610,289 | * | 10/1971 | Moss | 138/110 X |
| 3,889,717 | * | 6/1975 | Obadal et al. | 138/110 X |
| 4,456,034 | * | 6/1984 | Bixby | 138/131 X |
| 4,489,759 | * | 12/1984 | Yamamura | 138/131 |
| 4,737,153 | * | 4/1988 | Shimamura et al. | 138/131 X |

* cited by examiner

Primary Examiner—Patrick Brinson
(74) Attorney, Agent, or Firm—Joseph V. Tassone

(57) ABSTRACT

An energy attenuation device for a fluid-conveying line, and a method for attenuating energy in such a line, are provided. The device includes one or more hose sections disposed in the fluid-conveying line, and at least one spring disposed in at least a portion of each of the hose sections.

15 Claims, 8 Drawing Sheets

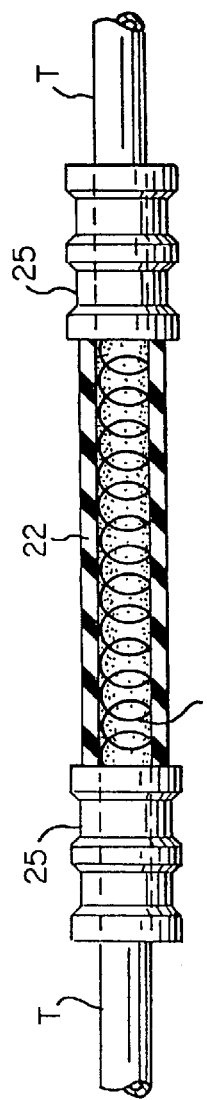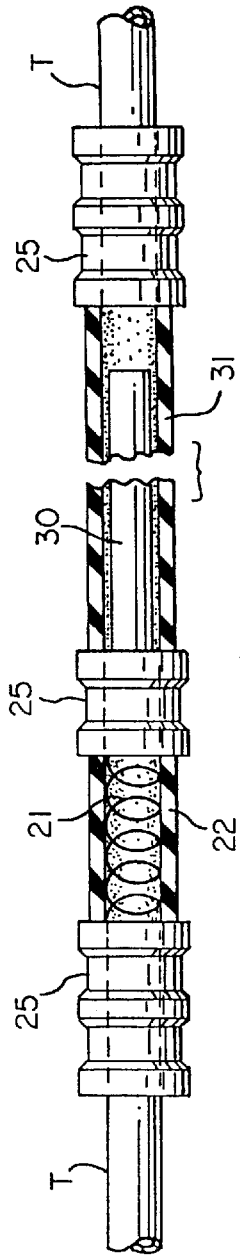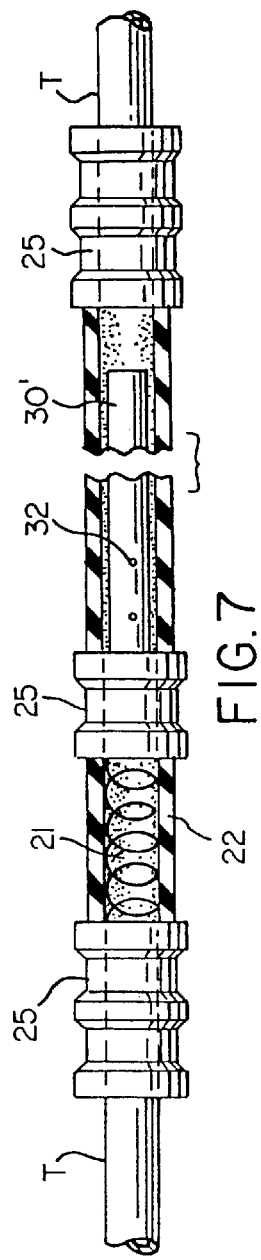

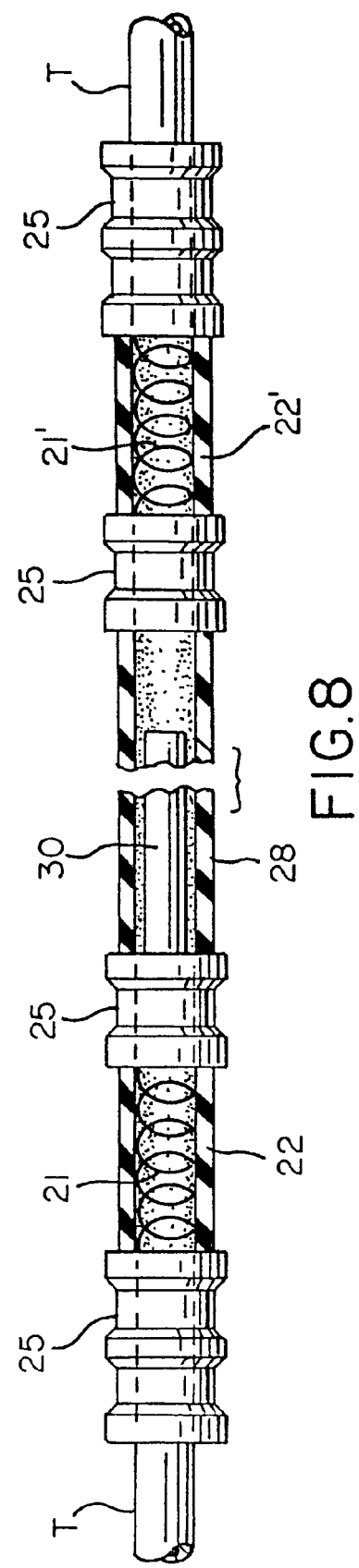

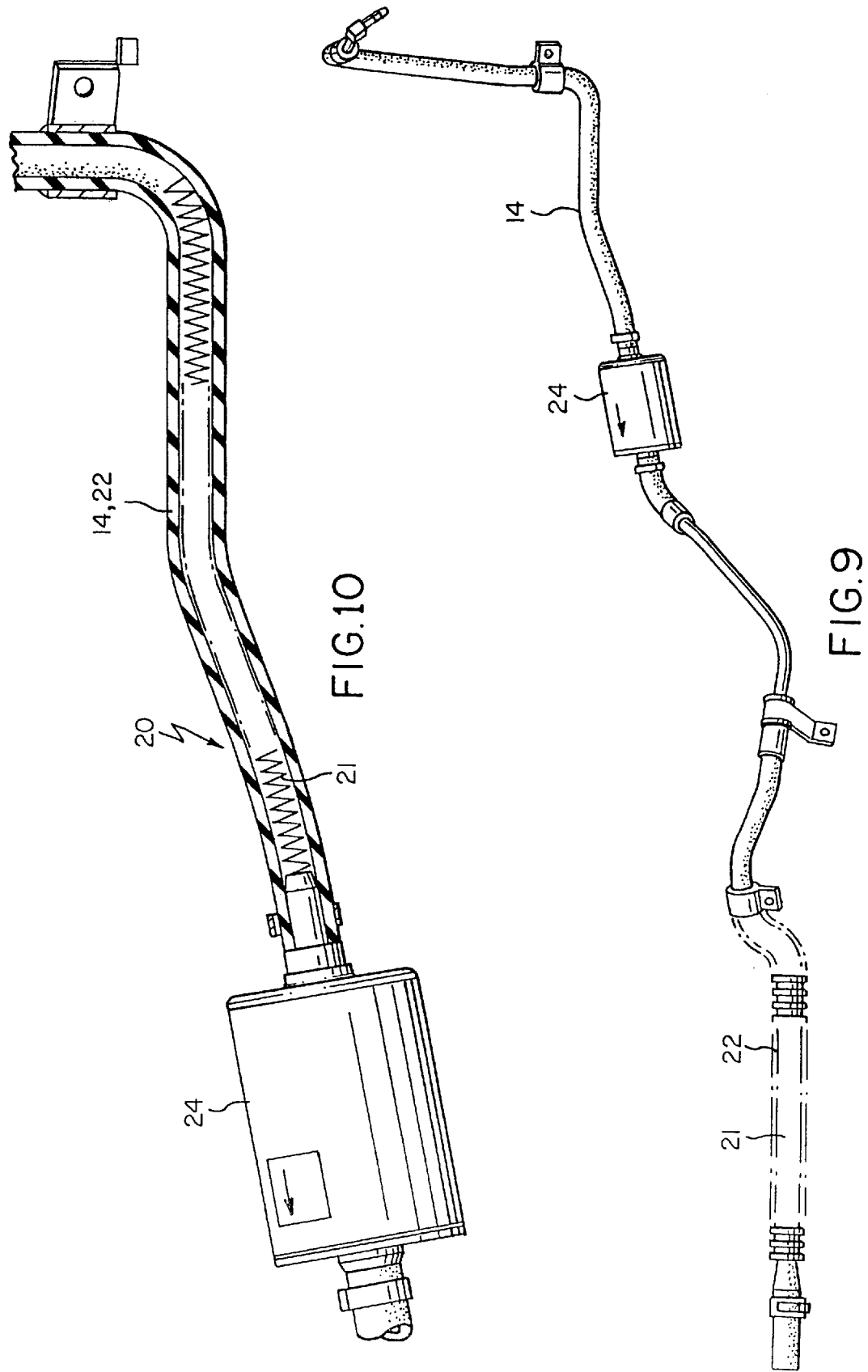

ENERGY ATTENUATION DEVICE FOR A FLUID CONVEYING LINE AND METHOD OF ATTENUATING ENERGY IN SUCH A LINE

This application is a divisional application of its parent application Ser. No. 08/853,770 filed May 9, 1997 now U.S. Pat. No. 6,125,890; which in turn, is based on provisional application Ser. No. 60/020,946 of Jul. 1, 1996.

BACKGROUND OF THE INVENTION

1. Field of the Invention

This invention relates to a new energy attenuation device for a fluid-conveying line and to a method of attenuating energy in such a line. The invention is particularly suitable for placement in the hydraulic system of a power steering unit of a vehicle, although the invention would also be suitable for any other fluid-conveying system.

2. Prior Art Statement

In hydraulic systems where the operating fluid is circulated by a pump, the pulsations of pressure that are generated by the pump are transmitted through the conduits and result in noise and/or vibration being produced by the hydraulic fluid. In the case of power steering fluid in vehicles, such noise and/or vibration is caused, for example, when vehicles are being parked or unparked at idle or very low speeds of movement thereof, such as barely moving into and out of a parking space or the like while the wheels of the vehicle are being turned by the power steering mechanism thereof. In particular, substantial noise and/or vibration (shutter) can be produced in such a situation when the power steering fluid passes through the power steering mechanism from the fluid pump to the effective steering structure. Further background in this area can be obtained from U.S. Pat. No. 3,323,305, Klees, whereby this U.S. Patent is being incorporated into this disclosure by this reference thereto.

Systems are known for controlling the resonation of pressure waves in fuel injection systems. For example, U.S. Pat. No. 5,168,855, Stone, passes fluid through check valves that are provided with a flow restriction either directly therein or in a bypass line. U.S. Pat. No. 5,509,391, DeGroot, provides a spool valve assembly for controlling flow between inlet and outlet ports.

SUMMARY OF THE INVENTION

It is therefore an object of the present invention to provide an improved device and method for attenuating energy in a system that conveys fluid.

This object is realized pursuant to the energy attenuation device of the present invention by providing a hose section disposed in a fluid-conveying line, and disposing a spring in at least a portion of the hose section.

Accordingly, it is an object of this invention to provide a novel energy attenuation device having one or more of the novel features of this invention as set forth above or hereinafter shown or described.

Another object of this invention is to provide a new method of attenuating energy in a fluid-conveying line, the method of this invention having one or more of the novel features of this invention as set forth above or hereinafter shown or described.

Other objects, uses and advantages of this invention are apparent from a reading of the specification in conjunction with the accompanying schematic drawings, which form a part thereof and wherein:

BRIEF DESCRIPTION OF THE DRAWINGS

FIGS. 5–8 are views similar to that of FIG. 3 showing further exemplary embodiments of the energy attenuation device of this invention;

FIGS. 9 and 10 are exemplary embodiments showing the energy attenuation device of this invention in return lines of power steering systems;

DESCRIPTION OF PREFERRED EMBODIMENTS

Figure 1:
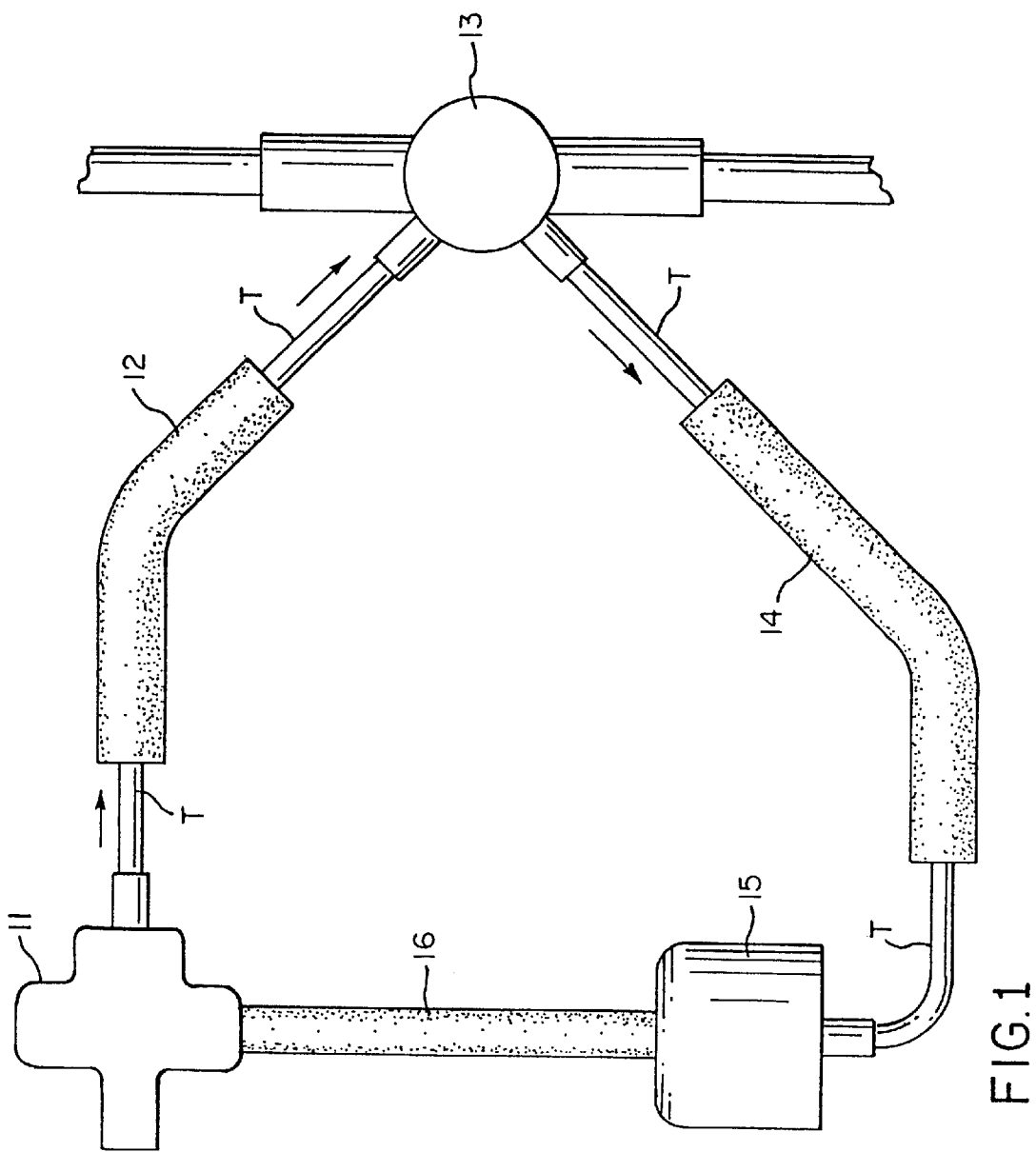
FIG. 1 illustrates a simplified automotive power steering system that is designed to incorporate the energy attenuation device of this invention.

While the various features of this invention are hereinafter illustrated and described as providing an energy or sound attenuation apparatus for an automotive power steering system, it is to be understood that the various features of this invention can be utilized singly or in various combinations thereof to provide an energy attenuation apparatus for other systems that convey fluid.

Therefore, this invention is not to be limited to only the embodiments illustrated in the drawings, because the drawings are merely utilized to illustrate one of the wide variety of uses of this invention.

Referring now to the drawings in detail, FIG. 1 illustrates a simplified automotive power steering system. During operation, the power steering pump 11 generates pressure ripples that are transmitted through tubing T, such as steel tubing, to the pressure hose assembly or pressure line 12, the power steering gear 13, the return hose assembly or return line 14, and the reservoir 15, and finally flow back to the pump 11 itself by means of the supply line 16. It should be noted that rather than being separated by a hose or similar conduit, the reservoir 15 and the pump 11 could actually be a single unit.

In order to greatly reduce noise, such as from resonance, especially in the return line 14, and thereby eliminate or at least greatly reduce the power steering noise or vibration generated by the power steering pump 11, the energy attenuation device of this invention, which is generally indicated by the reference numeral 20, is disposed in the return line 14 between the gear 13 and the reservoir 15 or the pump 11. Alternatively, it would also be conceivable to dispose the energy attenuation device 20 in the pressure line 12, or in both the return line 14 and the pressure line 12. Various exemplary embodiments of the energy attenuation device 20 and components and arrangements thereof are illustrated in FIGS. 2–10, and will be described in detail subsequently.

Figure 2:
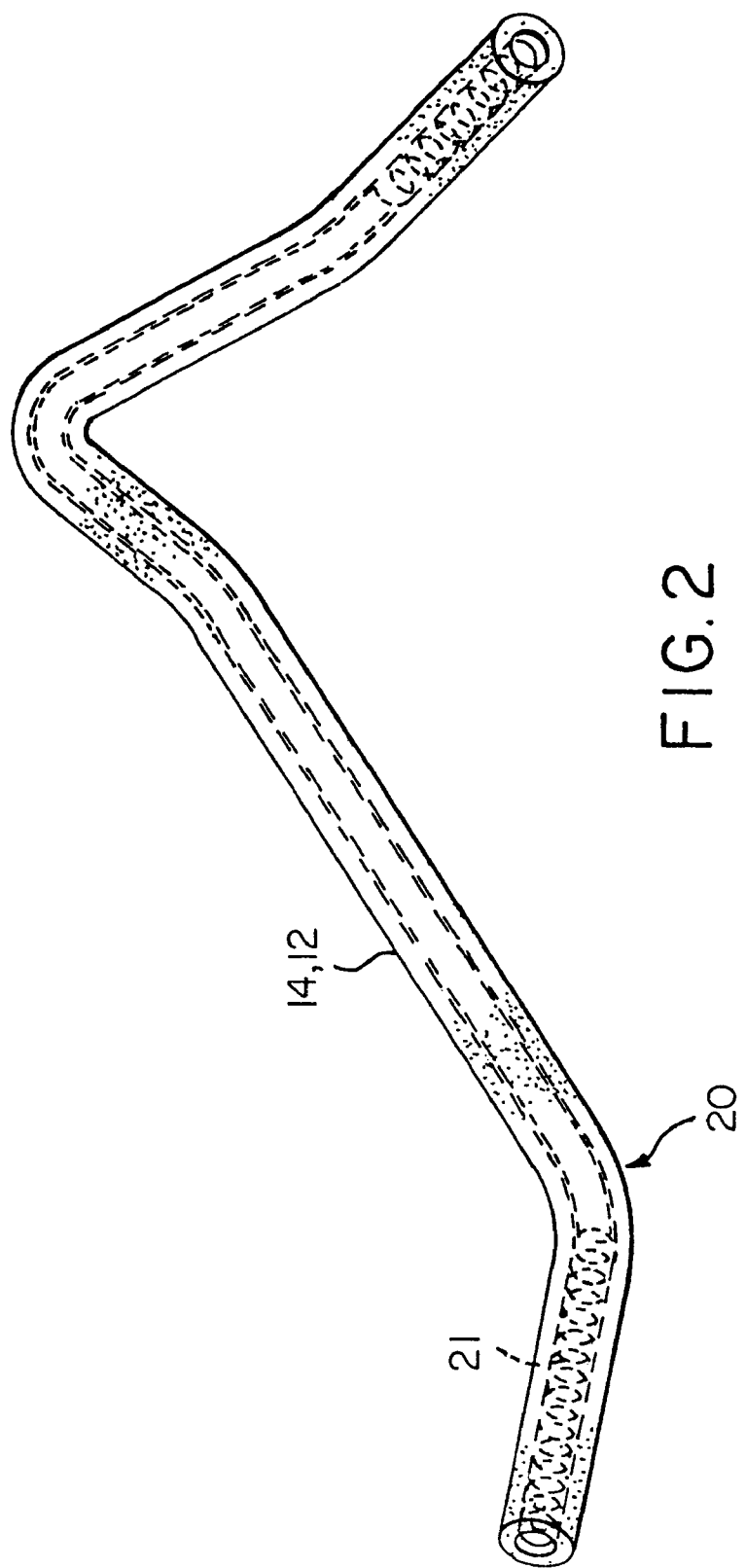
FIG. 2 shows one exemplary embodiment of the energy attenuation device of this invention.

One exemplary embodiment of the energy attenuation device 20 of this invention is shown in FIG. 2, and comprises a spring 21 that is disposed, for example, in the return line 14 or the pressure line 12 of the system of FIG. 1, although the spring 21 can also be disposed in a separate hose section that is in turn disposed in such return line 14 or pressure line 12, as illustrated in the exemplary embodiments of FIGS. 3 and 5–8, where the spring 21 is shown disposed in a hose section 22.

FIG. 10 illustrates how the inventive energy attenuation device 20 is disposed in a return line 14 or separate hose section 22 provided in a return line 14 of a power steering system, with the return line 14 or hose section 22 leading to an optional filter element 24. As can be seen in this embodiment of an actual segment of a return line 14 of a power steering system, the spring 21 does not extend throughout the entire length of the return line 14 or hose section 22. Rather, the spring 21 is permitted to freely float in the hose section, thus centering itself, or coming to rest at one end of the hose section, as fluid flows through the system. Although the other illustrated embodiments, which are provided for the purpose of showing various alternative arrangements, show the spring 21 as occupying most if not all of a given hose section 22, in reality such springs 21 would probably not extend throughout the entire length of the hose section but rather would have a configuration similar to that shown in FIG. 10.

Figure 3:
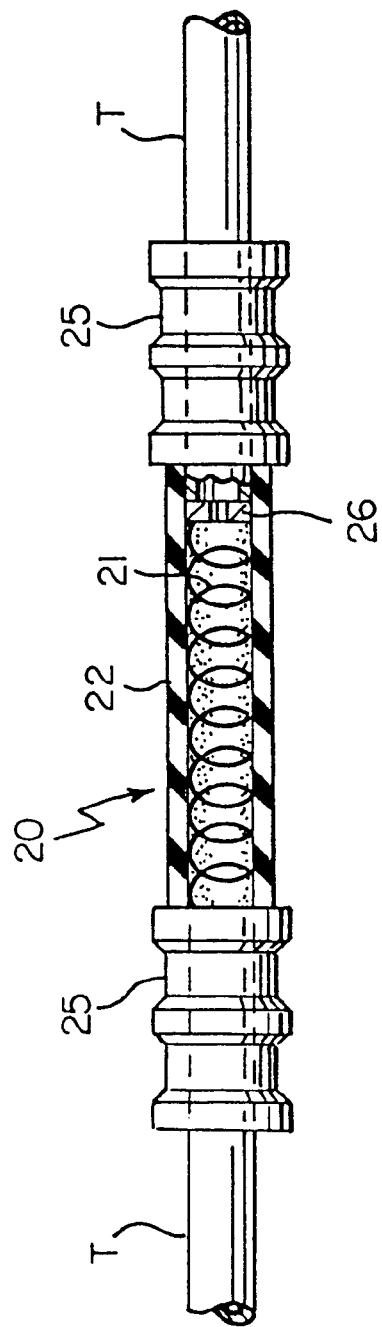
FIG. 3 illustrates, partially in cross-section, another exemplary embodiment of the energy attenuation device of this invention.

In the embodiment illustrated in FIG. 3, a hose section 22, which is, for example, a flexible hose made of rubber or other elastomeric material, is disposed between two tubing members T, with each end of the hose section 22 being connected to a respective tubing member by means of a coupling 25. The movement of the spring 21 within the hose section 22 can be limited in any suitable manner, such as by the provision of a washer 26 at one or both ends of the hose section 22, or at any other suitable location in the hose section. The couplings 25 themselves can also be used to limit the movement of the spring 21, as shown, for example, in the embodiments of FIGS. 5–8. In addition, the hose section 22 could be molded directly to the spring 21, in which case the spring would have a diameter that is actually slightly greater than the inner diameter of the hose section. However, as indicated previously, it is presently preferred that the spring 21 be allowed to float freely within the hose section 22.

As indicated previously, especially in conjunction with FIG. 10, the spring 21 is expediently of such a length that it will not extend over the entire length of the hose section 22. Such a spring 21 could, however, extend over the entire length of the hose section 22, extend over a substantial portion thereof, or extend over only a short portion of the length of the hose section 22. If fixed within the hose section 22, a spring 21 that does not extend over the entire length thereof could be fixed in position at any suitable location thereof. Furthermore, more than one spring 21 could be disposed in the return line 14 or pressure line 12. For example, FIG. 8 shows an embodiment wherein a first spring 21 is disposed in the hose section 22, and a further spring 21' is disposed in a second hose section 22'. In this embodiment, the two springs 21, 21' are separated from one another by a further hose section 28" as will be described in detail subsequently.

The inventive energy attenuation device 20 can also be used in conjunction with a steel cable device, such as the ¼ wave steel tuning cable device 30 of FIGS. 6 and 8, or with a device such as that shown in FIG. 7. In the device of FIGS. 6 and 8 a steel cable 30 is disposed in a further hose section 31 and 28 respectively that is interconnected to the hose section 22 and 22' by means of a further coupling 25. The device of FIG. 7 differs from that of FIG. 6 in that rather than being provided with a steel cable, a cable 30' made of plastic, such as Teflon, is provided. In this embodiment, the plastic cable 30' is provided with holes 32. In the embodiment of FIG. 8, the further hose section 28, in which is disposed the cable 30, which could either be a steel cable or a plastic cable as shown in FIG. 7, is disposed between two hose sections 22, 22' that contain a spring 21, 21' respectively, with the hose section 28 being interconnected with the hose sections 22 and 22' via couplings 25.

It should furthermore be noted that the inventive energy attenuation device 20, with its spring 21 in a hose section 22, can be used in conjunction with a variety of heretofore known sound and vibration attenuation devices in addition to the cable means shown in FIGS. 6–8, with such heretofore known devices including additional chambers and added hose sections. For example, reference is made to U.S. Pat. Nos. 4,611,633 (Buchholz et al), 5,172,729 (Vantellini) and 5,201,343 (Zimmermann et al), whereby such U.S. Patents are being incorporated into this disclosure by this reference thereto. FIG. 9 illustrates a further working embodiment of the energy attenuation device 20 of the present invention as disposed in a return line 14.

Figure 4:
FIG. 4 shows one exemplary embodiment of the spring of the energy attenuation device of this invention.

It is to be understood that the characteristics, such as length, thickness, tension, number of coils per inch, etc., of the spring 21 of the inventive energy attenuation device 20 can vary in conformity with existing requirements. In addition, this spring can be made of any suitable material, such as metal, especially stainless steel, or plastic. For example, one exemplary embodiment of a spring 21 is illustrated in FIG. 4. This spring is made of stainless steel, and is therefore particularly suitable for the environment of power steering fluid. This particular spring is designed to have six coils per inch, with an outer diameter of approximately 0.86 cm (0.34 inches), with the wire of the spring itself having a thickness of about 0.061 cm (0.024 inches). As indicated above, the characteristics of the spring will depend upon a particular pump application. Thus, any of the exemplary embodiments illustrated in the drawings can have different diameters and sizes of both the hose sections and the springs.

Figure 11:
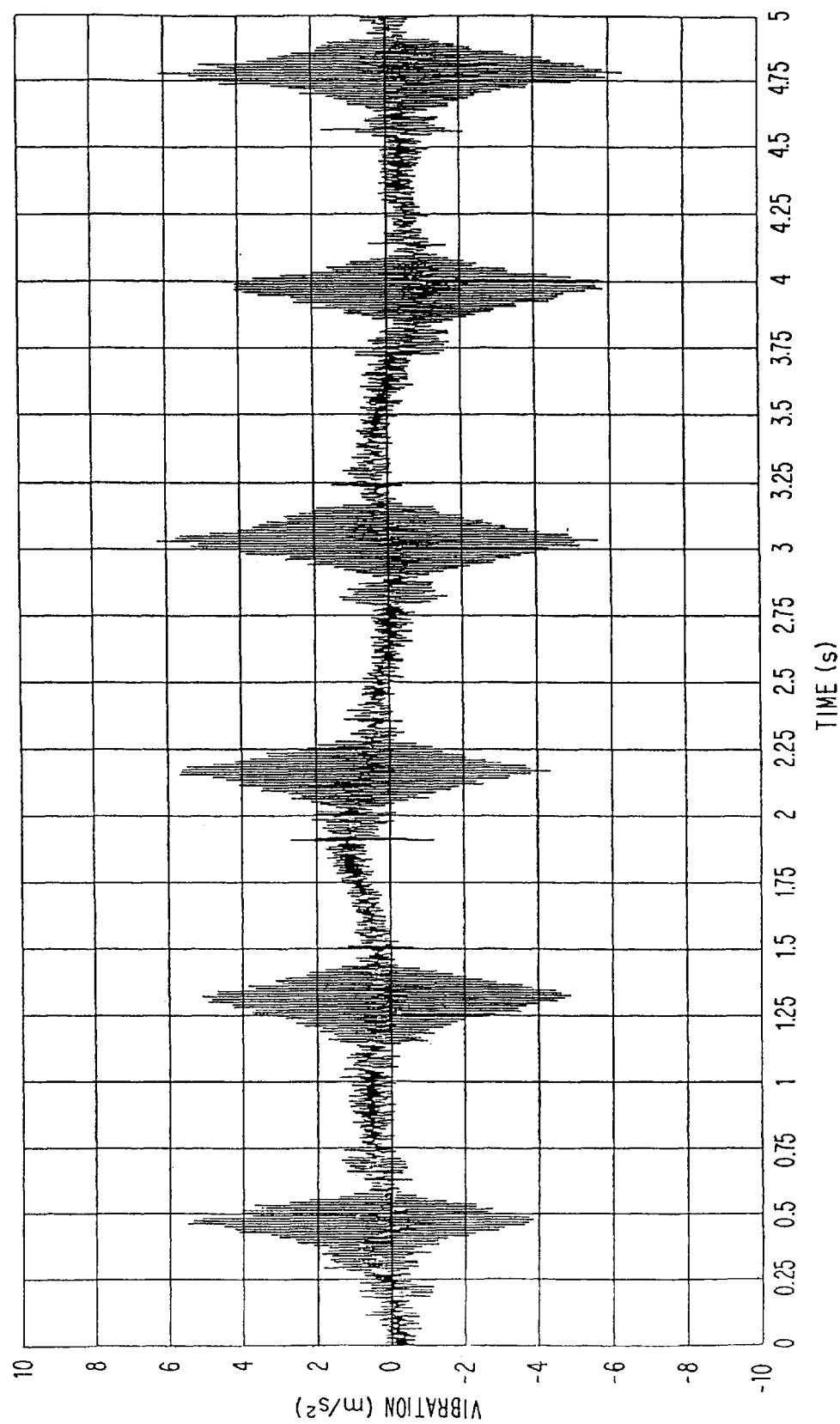
FIG. 11 is a graph showing large migrations or spikes of vibration in the return line of a power steering system that does not incorporate the energy attenuation device of the present invention.
Figure 12:
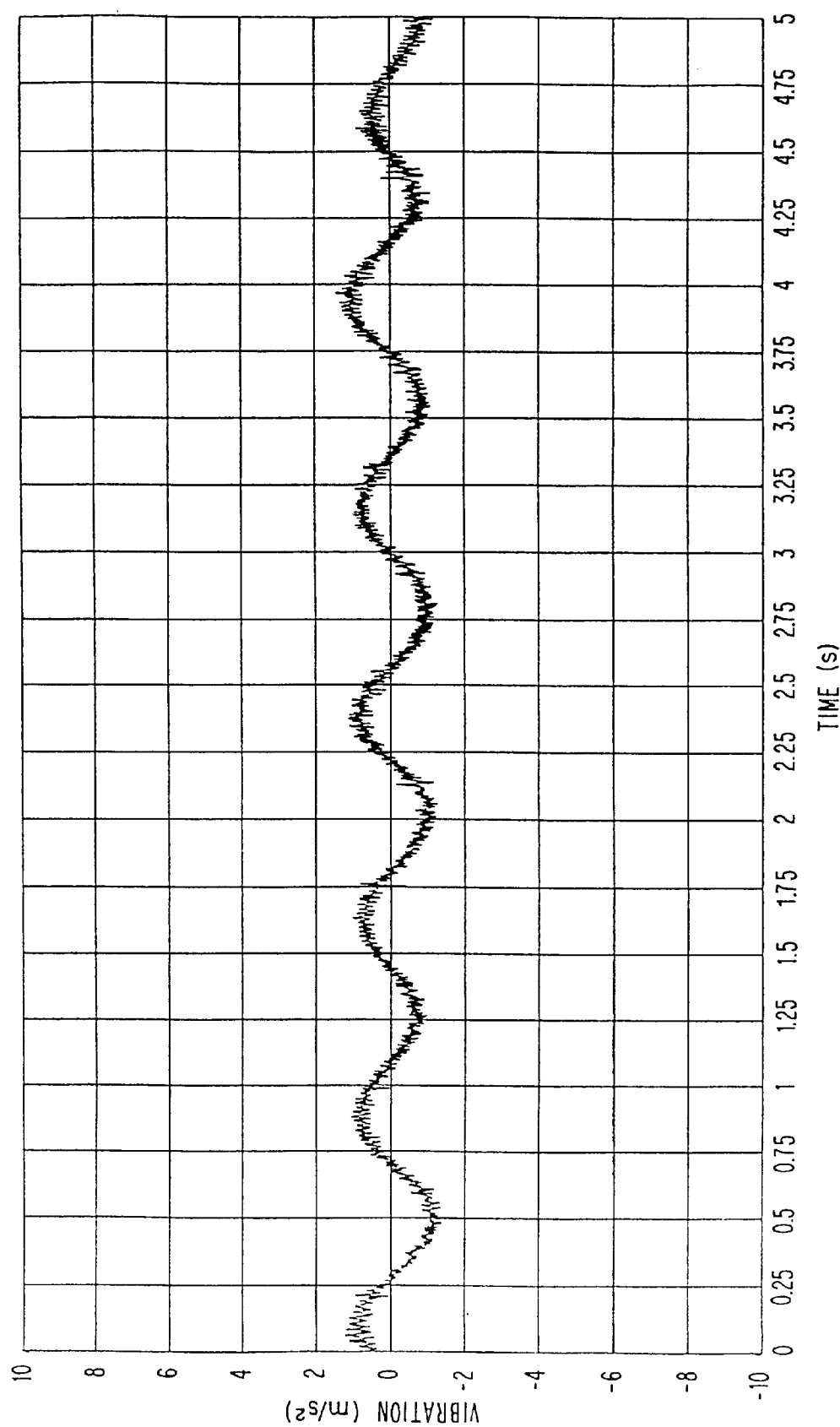
FIG. 12 is a graph showing significantly reduced vibration in a return line of a power steering system that has incorporated the inventive energy attenuation device therein.

As indicated previously, the pressure pulses resulting from the revolutions of a pump create vibrations and noise. This phenomena, along with the significant improvement provided by the inventive energy attenuation device, are illustrated in FIGS. 11 and 12 wherein vibrations measured in $m/s^2$ are plotted versus real time. In particular, from the vibration measurement shown in FIG. 11 at the tie rod end of a power steering system that is not provided with the inventive energy attenuation device, very large migrations of the generated vibrations can be seen. In contrast thereto, in the graph shown in FIG. 12 of the vibration situation as it exists downstream of an inventive energy attenuation device inserted into the return line of a power steering system, no large spikes or migrations can be seen in the curve, which is a sign wave having low amplitude vibrations.

In view of the foregoing, it can be seen that this invention not only provides a new energy attenuation device, but also this invention provides a new method for attenuating energy in a fluid conveying system.

While the forms and methods of this invention now preferred have been illustrated and described as required by the Patent Statute, it is to be understood that other forms and method steps can be utilized and still fall within the scope of the appended claims, whereby it is believed that each claim sets forth a novel, useful and unobvious invention within the pervue of the Patent Statute.

What is claimed is:

1. An energy attenuation device for a liquid-conveying line, comprising:

a hose section disposed in said liquid-conveying line; and a first spring disposed in a non-embedded manner within at least a portion of said hose section and not extending beyond said hose section, wherein said spring provides energy attenuation for liquid that is being conveyed through said liquid-conveying line.

2. An energy attenuation device as set forth in claim 1, wherein said spring is disposed in only a portion of said hose section.

3. An energy attenuation device as set forth in claim 2, wherein said spring is disposed in the vicinity of an end of said hose section.

4. An energy attenuation device as set forth in claim 2, wherein said spring is disposed in a middle portion of said hose section.

5. An energy attenuation device as set forth in claim 2, wherein a second spring is disposed in said hose section.

6. An energy attenuation device as set forth in claim 1, wherein said spring extends over the entire length of said hose section.

7. An energy attenuation device as set forth in claim 1, wherein a second separate hose section is disposed in said liquid-conveying line, and wherein a second spring is disposed in said second hose section.

8. An energy attenuation device as set forth in claim 1, wherein a washer means is disposed at least at one end of said spring to hold it in place in said hose section.

9. An energy attenuation device as set forth in claim 1, wherein said hose section is molded directly onto said spring.

10. An energy attenuation device as set forth in claim 1, wherein said spring has an outer diameter that is slightly greater than an inner diameter of said hose section.

11. An energy attenuation device as set forth in claim 1, wherein said spring is of such a diameter and length that it is adapted to float freely within said hose section.

12. A method of attenuating energy in a liquid-conveying line, including the steps of:

disposing a hose section in said liquid-conveying line; and disposing a spring in a non-embedded manner within at least a portion of said hose section such that said spring does not extend beyond said hose section, wherein said spring provides energy attenuation for liquid that is being conveyed through said liquid-conveying line.

13. A method as set forth in claim 12, which includes the step of providing said spring with such a diameter and length that it can float freely within said hose section.

14. An energy attenuation device as set forth in claim 1, wherein said hose section is a flexible hose section of elastomeric material.

15. An energy attenuation device as set forth in claim 1, wherein said spring has an outer diameter that is less than an inner diameter of said hose section.

* * * * *